United States Patent [19]
Glover et al.

[11] 3,861,972
[45] Jan. 21, 1975

[54] INTRAVENOUS CATHETER

[75] Inventors: George M. Glover, Somerville; Melvin Nimoy, East Brunswick; DeWitt R. Petterson, Basking Ridge; Albert J. Volk, Martinsville, all of N.J.

[73] Assignee: Johnson & Johnson, New Brunswick, N.J.

[22] Filed: Oct. 20, 1972

[21] Appl. No.: 299,547

Related U.S. Application Data

[60] Division of Ser. No. 66,429, Aug. 24, 1970, abandoned, which is a continuation-in-part of Ser. No. 7,286, Jan. 30, 1970, abandoned.

[52] U.S. Cl............... 156/86, 128/214.4, 156/198, 156/272, 156/294, 156/303.1, 264/342, 264/DIG. 71
[51] Int. Cl. .......................................... B29c 27/02
[58] Field of Search .......... 156/84.85, 86, 272, 294, 156/303.1, 295, 293, 198, 211, 247, 248, 305; 128/214.4, 348, 349 R, DIG. 18; 264/342, DIG. 71

[56] References Cited
UNITED STATES PATENTS

| | | | |
|---|---|---|---|
| 2,308,484 | 1/1943 | Auzin et al. | 156/86 |
| 3,204,634 | 9/1965 | Koehn | 128/124.4 |
| 3,325,325 | 6/1967 | Ward | 156/86 |
| 3,406,685 | 10/1968 | May | 128/214.4 |
| 3,470,046 | 9/1969 | Verdin | 156/86 |
| 3,566,874 | 3/1971 | Shepherd et al. | 128/348 |

FOREIGN PATENTS OR APPLICATIONS 785,136  10/1957  Great Britain

*Primary Examiner*—Charles E. Van Horn
*Assistant Examiner*—Frank Frisenda, Jr.

[57] ABSTRACT

A catheter-hub assembly is made by heat shrinking a single length of expanded plastic tubing into contact with a mandrel having a catheter forming portion and a hub forming portion, and simultaneously or subsequently reinforcing the section of tubing that overlies the hub forming portion of the mandrel to provide a relatively rigid hub construction. The reinforcement is preferably accomplished by simultaneously heat shrinking a plastic sleeve having a crosslinked outer surface and an uncrosslinked inner surface into contact with the hub section and forming a bond between the tubing and the sleeve by melting the uncrosslinked inner surface of the sleeve which is in contact with the tubing.

2 Claims, 12 Drawing Figures

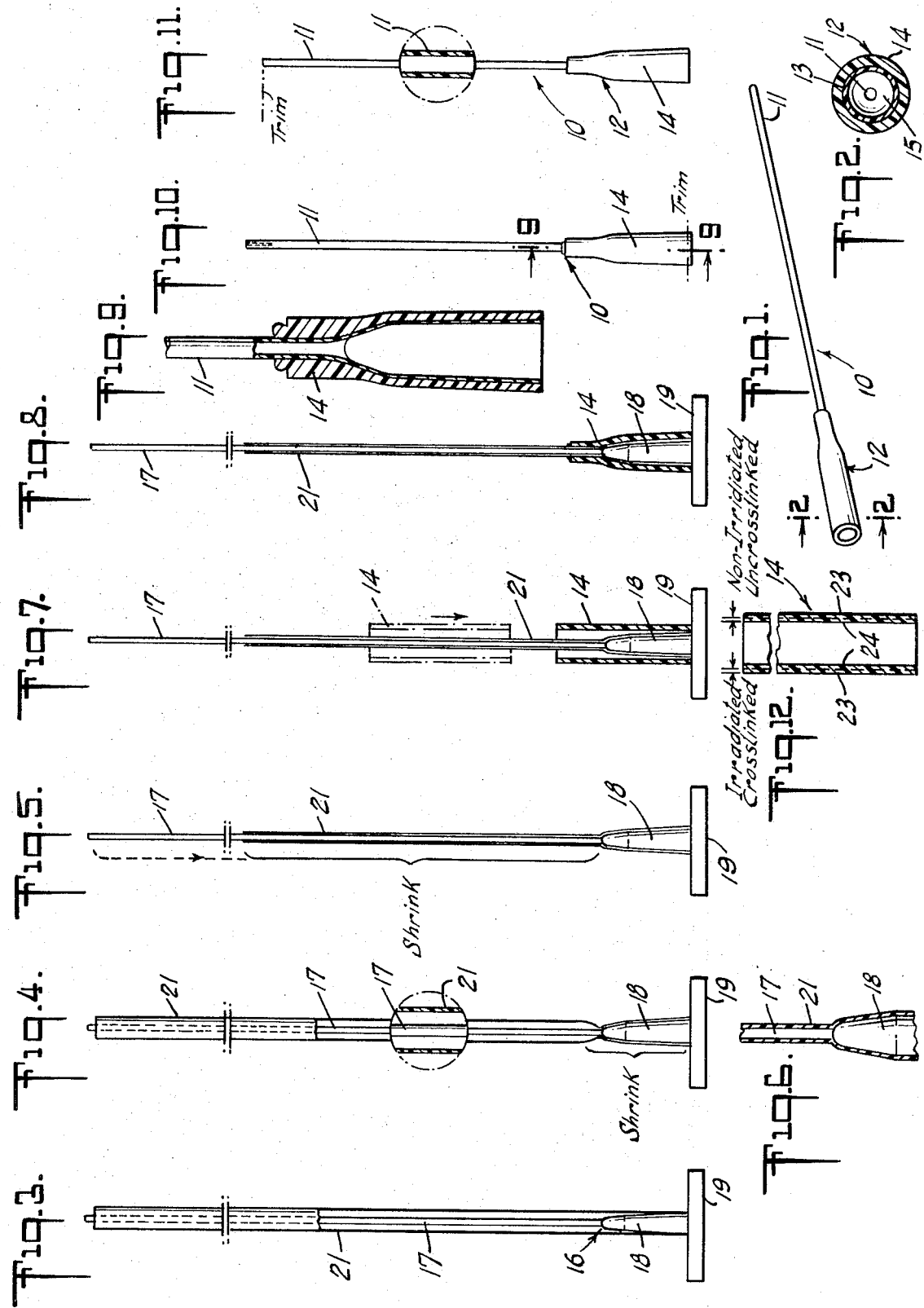

3,861,972

INTRAVENOUS CATHETER

This is a division of application Ser. No. 66,429, filed Aug. 24, 1970, now abandoned, which was, in turn, a continuation-in-part of application Ser. No. 7,286, filed Jan. 30, 1970, now abandoned.

BACKGROUND OF THE INVENTION

This invention relates to an intravenous catheter and, more particularly, to an integral plastic catheter-hub assembly.

Flexible intravenous catheters that sheath an intravenous needle have been in use for many years, however, new and improved constructions and methods of fabricating are continuously being sought. Of particular interest is the hub construction of the assembly and the manner in which the flexible catheter tubing is secured to the hub.

In previous devices, such as that shown in U.S. Pat. No. 3,094,122, the catheter tubing was stretched over a standard metal hub and held against axial displacement only by the gripping action of the tubing on the hub. This type of construction has proven to be unsatisfactory because of the expenses in manufacturing the individual components of the assembly and the unreliability of the attachment between the catheter and hub.

In recent years, the use of heat shrinkable expanded plastic materials in the fabricating of catheters has grown in popularity and these materials have permitted unique catheter constructions which possess manufacturing tolerances and characteristics superior to prior catheters. One such device is described and illustrated in U.S. Pat. No. 3,406,685 wherein expanded plastic tubing is heat shrunken over a metal sleeve and then a hub is placed over the sleeve and tubing and riveted thereto. Although a more precision catheter is provided, the coupling between the catheter and hub remains inadequate and the interior surface of the catheter-hub assembly fails to provide the desired homogeneous, chemically inert surface area obtainable with the subject invention.

SUMMARY OF THE INVENTION

The preferred embodiment of the present invention provides a totally unique catheter-hub assembly that may be easily manufactured from only two tubular lengths of heat shrinkable expanded plastic material. The resulting product has a relatively long flexible catheter section that is formed from the same tubing as the axially enlarged interior surface of the hub section. The second length of tubular plastic is integrally bonded to the first length and provides a rigid reinforcement for the hub portion of the assembly.

In the manufacture of the preferred catheter-hub assembly of this invention, a first length of expanded plastic tubing is heat shrunk into contact with a mandrel having a catheter forming portion and a hub forming portion. An expanded plastic sleeve is then heat shrunk into contact with the outer surface of the tubing which is in contact with the hub forming portion of the mandrel and bonded thereto. The integral catheter-hub assembly may then be removed from the mandrel and the distal end of the catheter may be tapered or beveled to provide smoother insertion into the lumen of a blood vessel or other body member. In finished form, the catheter-hub assembly is precisely dimensioned internally to sheath an intravenous needle and needle hub.

BRIEF DESCRIPTION OF THE DRAWINGS

The invention will be particularly described with reference to the following detailed description of the preferred embodiments of the invention when considered together with the attached drawings, in which:

FIG. 1 is a perspective view of the intravenous catheter-hub assembly of this invention;

FIG. 2 is a cross sectional view taken through line 2—2 of FIG. 1;

FIG. 3 is a side elevational view showing an expanded plastic tubing placed over a catheter and hub forming mandrel;

FIG. 4 is a side elevational view showing the expanded plastic tubing of FIG. 3 heat shrunk in the hub area of the mandrel;

FIG. 5 is a side elevational view showing the expanded plastic tubing in FIG. 3 completely heat shrunk into contact with the catheter and hub forming mandrel;

FIG. 6 is a fragmentary cross sectional view showing the tubing in contact with the catheter and hub forming mandrel;

FIG. 7 is a side elevational view showing an expanded plastic sleeve in place over the hub forming portion of the mandrel and a second expanded plastic sleeve shown in phantom lines to illustrate the placement of the sleeve over the mandrel;

FIG. 8 is a side elevational view showing the expanded plastic sleeve illustrated in FIG. 7 heat shrunk into contact with the outer surface of the plastic tubing in the area of the hub forming portion of the mandrel;

FIG. 9 is an enlarged fragmentary view illustrating the hub section of the catheter-hub assembly;

FIG. 10 is a side elevational view illustrating the catheter-hub assembly after it has been removed from the catheter and hub forming mandrel;

FIG. 11 is a side elevational view illustrating the completed catheter-hub assembly; and FIG. 12 is an enlarged cross sectional view of the preferred expanded plastic sleeve illustrated in FIG. 7.

Referring to FIGS. 1 and 2 of the drawing, there is shown a catheter-hub assembly 10 which comprises a relatively long flexible intravenous catheter cannula 11 and an integrally formed catheter hub 12. Catheter 11 and the interior layer 13 of hub 12 (see FIG. 2) are formed from a single length of heat shrinkable expanded plastic material and provide a homogeneous, chemically inert plastic surface throughout the entire length of the catheter-hub assembly. A relatively rigid heat shrunk plastic sleeve 14 forms the outer layer for hub 12 and encircles layer 13 and is bonded thereto to provide a rigid hub construction. The interior surface 15 of hub 12 is preferably formed with a luer taper and is adapted to receive standard luer-type fittings.

The method of forming the unique catheter-hub assembly of this invention is a significant part of this invention and will now be described in detail. It should be pointed out that the catheter-hub assembly is intended for use with an intravenous needle that is tightly sheathed within the catheter and hub for insertion into the lumen of a blood vessel or other body member. It will be apparent that the tolerances required to provide an efficient catheter-needle combination are very close and it is, therefore, desirable to have the internal diameter of the catheter and hub meet with rigid specifications. This is accomplished with the present invention by providing a mandrel 16 (see FIG. 3) having a catheter forming portion 17 and a hub forming portion 18 which correspond in configuration to the desired external dimensions of the needle and needle hub to be sheathed within the catheter-hub assembly. Mandrel 16 may be mounted on any suitable base or conveyor component as shown at 19 in FIG. 3. In the initial manufacturing step, a single length 21 of heat shrinkable expanded plastic tubing is placed over mandrel 16 and the lower end thereof is supported on base 19. The initial heat shrinking operation is confined to the hub area, as illustrated in FIG. 4, wherein a sufficient amount of heat is applied to the lower end of tubing 21 to cause the tubing to shrink into contact with the hub portion 18 of mandrel 16 to thereby form a tight fit between the tubing and the mandrel. The remainder of tubing 21 is then subjected to heat and shrinks into contact with the catheter forming portion 17 of mandrel 16. It has been found to be desirable to perform the initial heat shrinking operation in the area of hub portion 18 so that the tubing will fit firmly against the hub and not be pulled upwardly during the subsequent procedures.

FIG. 5 illustrates the position of tubing 21 relative to mandrel 16 subsequent to the heat shrinking operation and FIG. 6 is an enlarged fragmentary illustration which shows the precise conformity of the tubing to the mandrel after the tubing is in full contact therewith. It should be noted that the overall length of tubing 21, in the illustrated embodiment is reduced during the heat shrinking procedure and this reduction in length is accompanied by an increase in the wall thickness. It has been found that certain plastic materials will actually increase in length during the heat shrinking operation, however, the wall thickness will always increase regardless of the effect of the heat shrinking on the length of the tubing.

The next step in the fabrication of the catheter-hub assembly 10 is shown in FIG. 7 wherein a heat shrinkable expanded plastic sleeve 14 is placed over mandrel 16 and tubing 21 which is in contact therewith and is supported by base 19 at the lower end thereof. The sleeve is so proportioned that it is slightly longer in the axial direction than the hub portion 18. Sleeve 14 is next subjected to a heat shrinking operation and caused to shrink into contact with the tubing material that overlies hub portion 18 and the juncture formed between catheter forming portion 17 and hub forming portion 18 (see FIGS. 8 and 9).

The catheter-hub assembly 10 is then removed from mandrel 16 and each end trimmed to an appropriate length as illustrated in FIGS. 10 and 11. The relative thicknesses of the tubing 21 and the finished catheter section 11 are illustrated in the enlarged portions shown in FIGS. 4 and 11, respectively, wherein the latter cross section has increased in thickness due to the decrease in diameter of the catheter tubing during the heat shrinking operation.

As previously stated, an important aspect of the preferred embodiment of the present invention is to provide a catheter-hub assembly that may be manufactured from only two tubular lengths of expanded plastic material. Although it is possible that additional adhesives may be utilized to securely bond the reinforcing sleeve 14 to the underlying layer 13, a preferred and more economical construction has been discovered. The expanded plastic tubing 21 employed to form the catheter section and the interior surface of the hub section of the integral catheter-hub assembly of this invention is preferably composed of an irradiated-crosslinked polyolefin and the preferred material utilized in the construction of the expanded plastic sleeve 14 is composed of an outer layer 23 (see FIG. 12) of irradiated-crosslinked polyolefin and an inner layer 24 of non-irradiated uncrosslinked polyolefin. Polyethylene is presently the preferred polyolefin usable with this invention. Therefore, the radially outermost layer of the sleeve comprises crosslinked plastic and the radially innermost layer, which is to ultimately contact the tubing material 21 comprises uncrosslinked material. When sleeve 14 is heat shrunk into contact with tubing 21, the uncrosslinked inner layer 24 of the sleeve melts and creates an extremely secure bond with the tubing material. The bond between a non-irradiated-uncrosslinked surface and an irradiated-crosslinked surface has been found to be very strong and the resulting hub construction is very rigid. It was the discovery that a strong bond could be achieved between the non-irradiated-uncrosslinked inner layer of the sleeve and the irradiated-crosslinked catheter tubing that made possible the rigid hub construction of the integral catheter-hub assembly of this invention without the further necessity of using additional materials, such as adhesives.

The heat shrinkable expanded plastic materials usable with this invention may be considered to be standard commercial materials and it is the crosslinking of these materials that makes it possible to heat shrink the tubing and the sleeve after expansion of the plastics with heat and mechanical blowing.

The preferred method for crosslinking the polyethylene tubing material used in the preferred process of this invention is accomplished commercially by irradiation with high-energy electrons. The electrons penetrate the thin cross section of the polyethylene tubing used for the catheter, so that all parts of the tubing are completely irradiated and crosslinked. In the case of the sleeve material, the overall thickness of the original material is approximately five times greater than that of the catheter tubing and the irradiation is controlled to penetrate only partially through the sleeve material and to leave the inner layer 24 of the wall non-irradiated and, therefore, uncrosslinked.

Although polyethylene is described above as the preferred material usable for both the catheter and sleeve portions of the catheter-hub assembly of the present invention, other heat shrinkable plastic materials have been successfully tested and found to yield catheter-hub assemblies possessing the desired characteristics of strength and flexibility. Also, it is not necessary that the same material be utilized in the construction of the catheter tubing and the reinforcing sleeve. The essential characteristic of the catheter tubing material is that it be heat shrinkable and, obviously, it must possess all of the characteristics, such as, chemical inertness, that render it useful as an intravenous catheter. Polyolefins were designated above as being particularly preferred for use as the tubing material, however, other successfully tested heat shrinkable polymers include semi-rigid polyvinylidine fluoride and polytetrafluorethylene. It has also been found that certain natural and synthetic rubbers, such as, neoprene and butyl rubber may be effectively crosslinked for a subsequent heat shrinking operation. The above plastic and rubber materials have been set forth herein by way of example only and it is not intended that the term "plastic" as used herein be limited to such materials.

Although sleeve 14 is preferably constructed as illustrated in FIG. 12, the usable materials for the construction of the sleeve may be very diversified, since it is not necessary that the sleeve be heat shrinkable. Alternative structures have been developed for the fabrication of a catheter-hub assembly that include, among others, the premolding of a reinforcing sleeve in the configuration shown in FIGS. 8 and 9 and the subsequent bonding of the sleeve to the exterior surface of the heat shrunken section of the catheter tubing that overlies the hub forming portion 18 of mandrel 16. A premolded metal sleeve and a premolded silicone rubber sleeve have been successfully tested. When using a premolded sleeve, and when using certain of the heat shrinkable plastic sleeves, it has been found to be necessary to utilize an additional adhesive in order to form a secure bond between the catheter and sleeve portions of the assembly. Any suitable adhesive which is compatible with the tubing and sleeve materials may be used for this purpose.

A further embodiment requires the application of a polymer, in the form of a coating, to the exterior surface of the heat shrunken tubing which overlies the hub forming portion of the mandrel and the subsequent polymerization of the coating to form a relatively rigid hub reinforcement.

The temperature required to accomplish the desired shrinking of the tubing and sleeve materials in the preferred process is not critical, however, it has been found that temperatures greater than 135° C. will not only shrink the materials into contact with the mandrel 16 but will also provide the necessary melting of the uncrosslinked inner layer 24 of the sleeve to create the bond necessary to securely attach the sleeve to the tubing.

Although the preferred embodiment has been described in detail above, it will be appreciated that additional methods may be utilized to fabricate and bond together the two necessary components of the catheter-hub assembly. For example, it is possible, and it has been accomplished experimentally, to assemble sleeve 14 over tubing 21 prior to placement of the tubing over the mandrel 16. In this process, a simultaneous shrinking and bonding will occur when heat is applied to the assembled parts. In fact, this procedure has been found to yield superior results in certain instances.

When a material such as polytetrafluoroethylene, which has an extremely low friction, is utilized, it has been found to be desirable to mechanically or chemically roughen the outer surface of the shrunken tubing material which is in contact with the hub portion 18 of mandrel 16, so that the sleeve material will form a more secure bond when brought into contact with the tubing.

Since a catheter is intended to be inserted into a body member of a patient, it is desirable and often necessary to make the catheter radiopaque so that its location may be detected in the event that it becomes disconnected from its supporting hub portion. This requirement is easily fulfilled with the subject invention since a radiopaque compound may be conveniently added to the tubing compound prior to the extrusion of the catheter tubing.

An additional catheter finishing operation is usually desirable after the catheter-hub assembly has been removed from the mandrel. This operation involves the formation of a taper or bevel on the end of the catheter to facilitate the penetration of the skin and underlying tissue by the intravenous needle-catheter during the placement of the catheter in the desired body member. This can be accomplished in any suitable manner and is not intended to be a part of this invention.

It will be apparent that the subject invention provides many advantages over all prior known devices of this type and these advantages are obtained in an extremely economical and simple manner. A homogeneous surface is now available throughout the entire length of the catheter-hub assembly, since a single length of tubing forms the entire inner surface of this assembly. By heat shrinking the expanded plastic sleeve over the hub portion of the mandrel, a firm bond is formed between the inner surface of the sleeve, which is preferably of uncrosslinked expanded plastic material, and the outer surface of the catheter tubing. Not only is an accurate luer taper provided, but the reinforcing sleeve provides a rigid hub construction that will withstand any handling or other abuse required to attach a needle hub or an external fitting to the catheter-hub assembly.

What is claimed is:

1. The method of making a plastic catheter-hub assembly comprising the steps of:
   1. providing a mandrel having a catheter forming portion and hub forming portion;
   2. placing a length of irradiated-crosslinked expanded plastic tubing over said mandrel, one end of said tubing overlying said hub forming portion and the remainder of said tubing overlying said catheter forming portion;
   3. placing an expanded plastic sleeve having an irradiated-crosslinked outer surface and an uncrosslinked inner surface over said one end of said tubing;
   4. applying heat to said tubing and said sleeve to cause said tubing to shrink into contact with said mandrel and to cause said sleeve to shrink into contact with said one end of said tubing, said heat being effective to melt said uncrosslinked inner surface to create a bond between said sleeve and said one end; and
   5. removing said assembly from said mandrel.

2. The method of claim 1 wherein said sleeve is positioned over said one end of said tubing prior to placing said one end over the hub forming portion of said mandrel.

* * * * *